Oct. 1, 1929.  E. T. DAVIS  1,729,990
VALVE
Filed Sept. 23, 1926  4 Sheets-Sheet 1
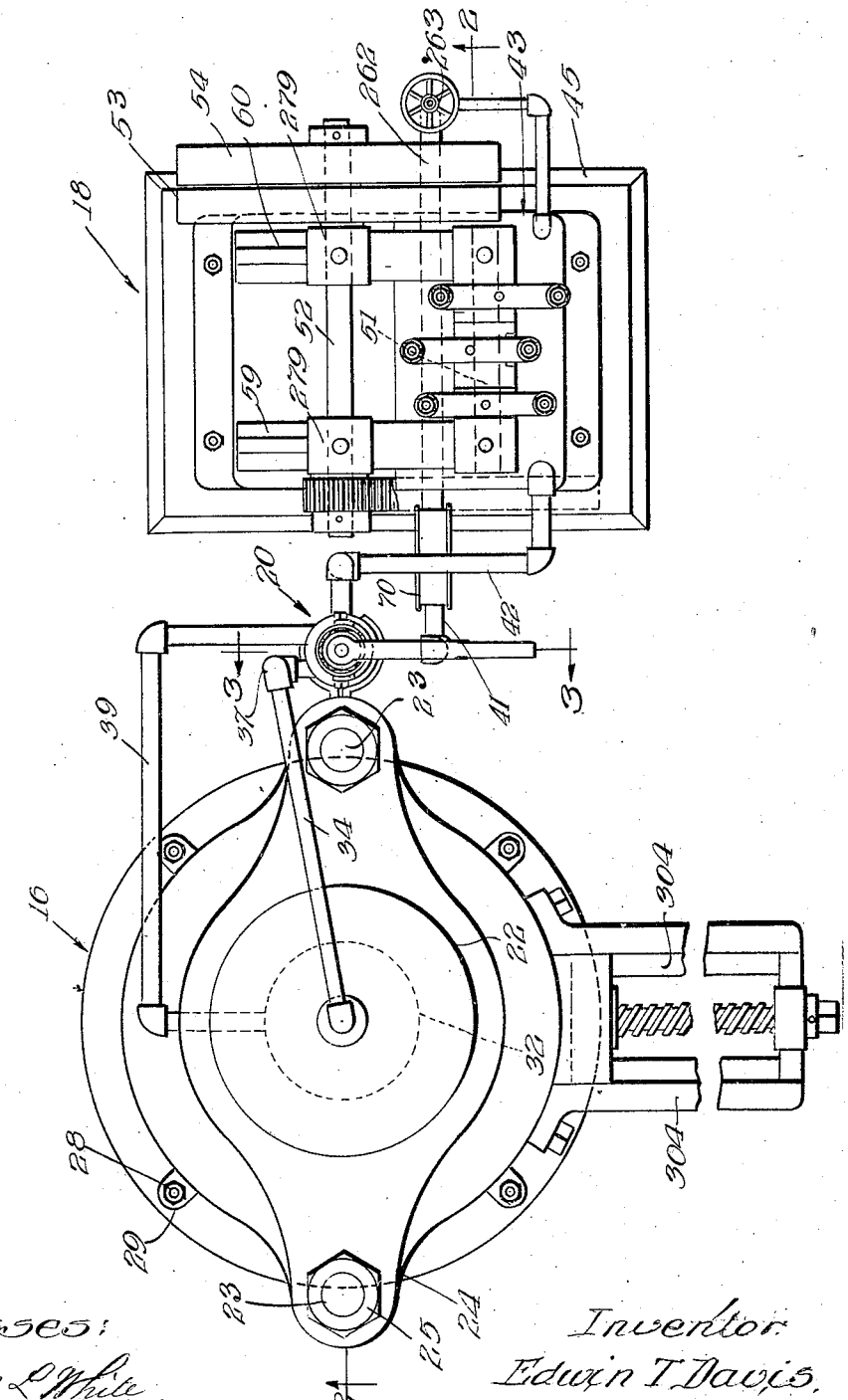
Witnesses:
Harry E. L. White
William D. Kilroy
Inventor
Edwin T. Davis
By Brown, Boettcher & Dienner
Attys.

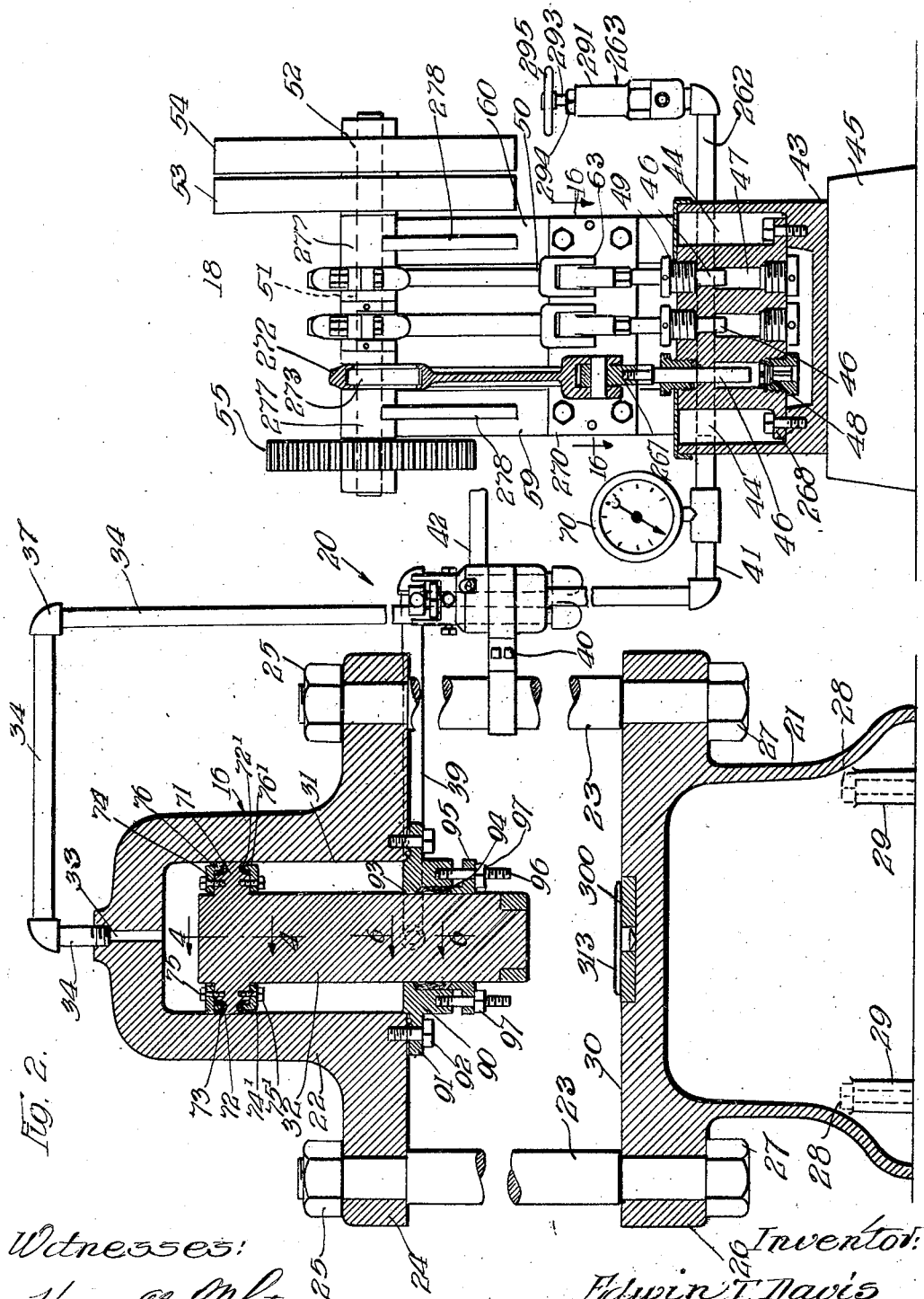

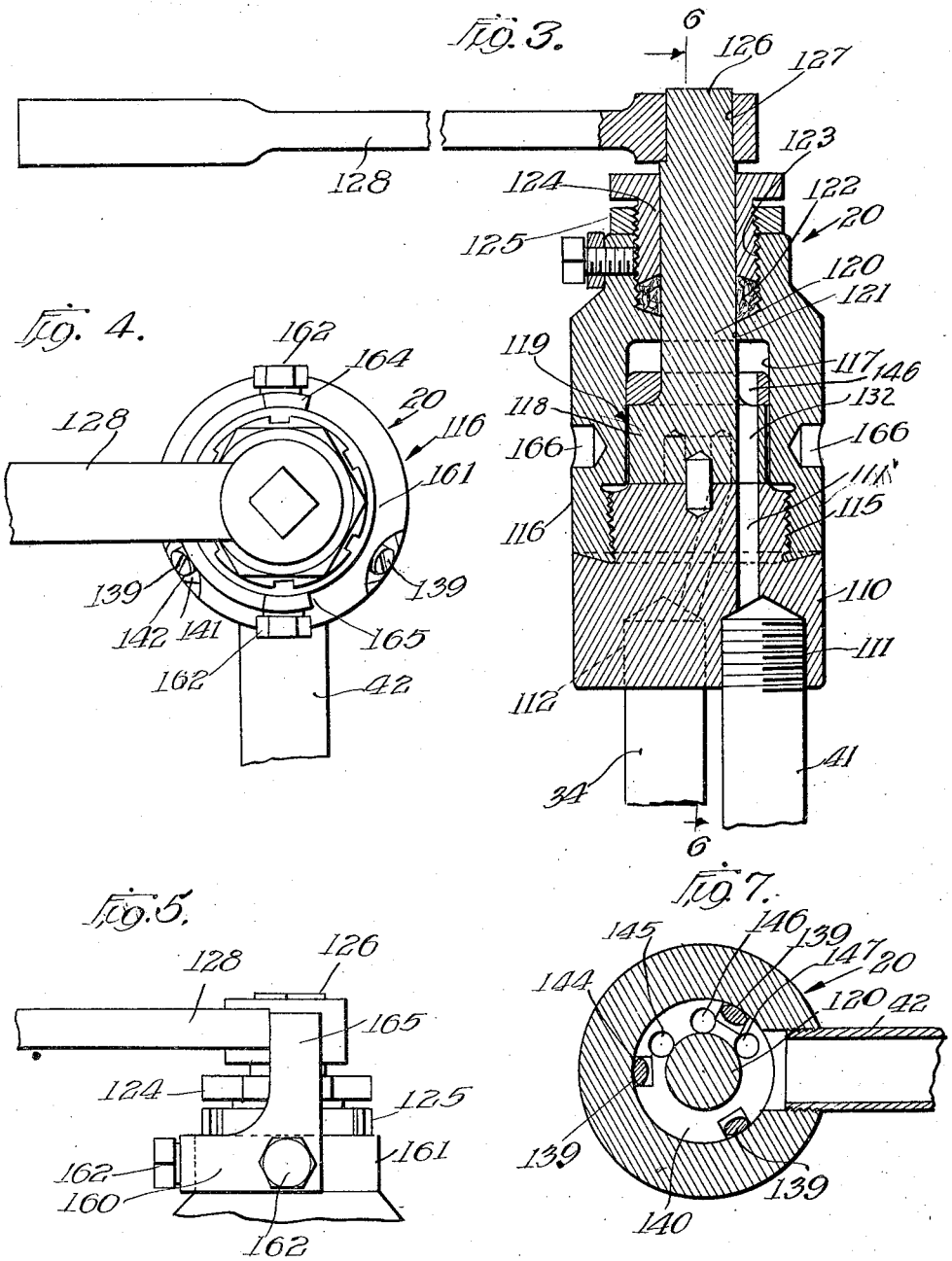

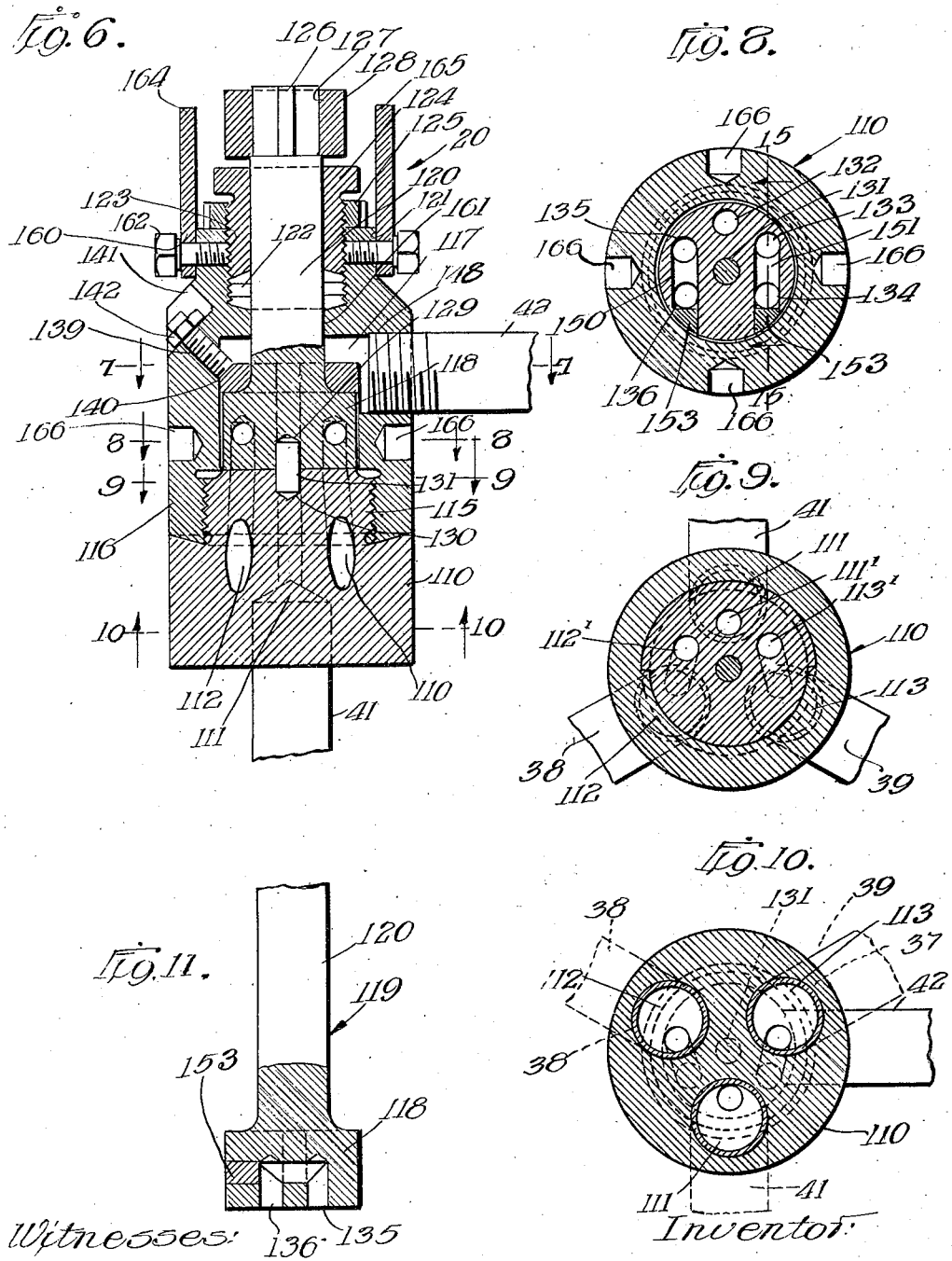

Patented Oct. 1, 1929

1,729,990

UNITED STATES PATENT OFFICE

EDWIN T. DAVIS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN

VALVE

Application filed September 23, 1926. Serial No. 137,204.

My invention pertains to a valve particularly suited for controlling a hydraulic press.

In the operation of a conventional hydraulic press, considerable difficulty has been experienced with leaky valves. The valves now available on the market for use on hydraulic presses are inefficient and hard to operate, and require constant attention and repairs.

Furthermore, a great many of the hydraulic presses now being used, especially those having the piston type plunger, require pull-back cylinders or counterweights. I employ a double acting press cylinder and force the piston in either direction under the action of the single control valve, by the liquid from the pump. Separate pull-back cylinders or counterweights are thereby avoided.

I provide a novel and simple valve particularly adapted for use as a control valve in a hydraulic press system. The valve of my invention performs the function of the several valves heretofore employed, and it alone is sufficient to enable the proper control of any conventional hydraulic press. Although I shall describe my novel valve mechanism as applied to a one cylinder piston type plunger press, the invention is not to be thus limited, for it may be used equally well with any two cylinder press, such for example, as a combination of one vertical and one horizontal cylinder. Even with a two cylinder press, only one of my novel valves need be employed for the proper control of the press.

In a hydraulic press system employing my novel valve mechanism, it is possible to stop or start the plunger substantially instantaneously at any position of its stroke in either direction of the motion of the plunger. My mechanism enables the plunger to be stopped without withdrawing the liquid in the plunger cylinder, thus causing the system to be at all times primed. That is to say, when the plunger is stopped in a given position, the pressure is automatically released from the plunger and all of the liquid is trapped in the cylinder due to the fact that the liquid coming from the pump is by-passed to the reservoir in the base of the pump. It is evident that this arrangement greatly relieves the pump of unnecessary labor.

In the valve of my invention, I have purposely eliminated the use of springs, plates and cone seats, inasmuch as these parts frequently become distorted by constant use, so as to insure relatively great longevity as far as the valve is concerned. Also I have provided the valve with U-shaped release ports in order to maintain the area of these ports at a minimum. This arrangement reduces the tendency of the pressure raising the valve off its seat when the pressure is released from the plunger cylinder. Also such a construction facilitates the lapping of the valve into its seat.

In accordance with the general features of my invention, I provide a valve particularly adapted for use in conjunction with hydraulic presses having a control lever adapted to be moved into any one of three positions. When the lever is in one of its extreme positions, the valve serves to cause the pressure to be applied to the pressure end of the plunger for the purpose of causing it to move on its working stroke. When the lever is in its other extreme position, it serves to release the pressure from the pressing end of the plunger and applies pressure to the opposite end so as to cause the plunger to move on its return or idling stroke. A central position of the lever results in the pressure being released from both ends of the piston plunger and causes the liquid to be held in both ends of the cylinder since it serves to by-pass the liquid under pressure through the return line into the supply reservoir of the pump. Thus it will be seen that I have provided a single valve which is capable of performing the functions of several valves and is of necessity of a simple and efficient arrangement.

Other objects and advantages of my invention will more fully appear from the following detail description, taken in connection with the accompanying drawings which illustrate one embodiment thereof and, in which:—

Figure 1 is a plan view of a hydraulic press system including the press, the pump, and the manual control valve mechanism;

Fig. 2 is a view in vertical section taken on the line 2—2 of Fig. 1, looking in the direction indicated by the arrows;

Fig. 3 is a vertical sectional view of the control valve taken on substantially the line 3—3 of Fig. 1, looking in the direction indicated by the arrows, and illustrating the construction of my novel control valve;

Fig. 4 is an enlarged fragmentary plan view of the valve shown in Fig. 3;

Fig. 5 is an enlarged fragmentary side view of the mechanism shown in Fig. 4, illustrating the stops associated with the control lever;

Fig. 6 is a vertical sectional view taken on substantially the line 6—6 of Fig. 3, looking in the direction indicated by the arrows;

Fig. 7 is a horizontal sectional view taken on the line 7—7 of Fig. 6, looking downwardly;

Fig. 8 is a horizontal sectional view taken on the line 8—8 looking in the direction indicated by the arrows in Fig. 6;

Fig. 9 is a horizontal sectional view, taken on the line 9—9 of Fig. 6, immediately below the end of the valve;

Fig. 10 is a sectional view taken on the line 10—10 of Fig. 6 looking upwardly;

Fig. 11 is a detail view illustrating the construction of the head of my novel valve rod.

Referring now to the drawings in detail, in which like reference numerals designate similar parts throughout the several views, 16 denotes generally a hydraulic press embodying the features of my invention.

I shall now describe in detail my novel valve 20. The valve 20 includes a base member 110 having three enlarged openings or pipe sockets in its lower portion 111, 112 and 113 (Figure 10). These openings are adapted to communicate with the pipe lines 41, 38 and 39, respectively. The base 110 is provided with a reduced threaded portion 115 adapted to have threaded thereon a bonnet or cap member 116. The openings 111, 112 and 113 are considerably reduced in the portion 115, as shown in Figure 6, to provide restricted fluid ports. These three ports are equidistant and at a common radius from the axial center of the valve seat. The bonnet or cap member 116 is provided with a cylindrical bore 117 in which is disposed the head 118 of a valve 119. The stem 120 of this valve extends upwardly through a reduced opening 121 in the cap member 116. A suitable packing 122 is disposed about the valve stem in an annular pocket 123. A gland follower 124 is threaded into this pocket 123 and serves to maintain the packing 122 in place. A lock nut 125 is threaded on the sleeve 124 and serves to lock it to the cap member 116. Also, it should be observed that the end of the valve stem 120 is squared, as designated at 126, and is adapted to fit in a square socket 127 in a lever-like handle 128. The lever 128 serves as a means for operating the control valve 20.

The valve head 118 is provided with a small aperture disposed centrally of the valve head and designated by the reference character 129. This aperture is adapted to align with an aperture 130 in the portion 115 of the base. A dowel pin 131 is disposed in these two apertures and serves to align the valve head with its seat on the portion 115. Thus it will be seen that the valve is free to rotate, but is restrained against lateral movement by the pin 131.

Also, the valve head is provided with five other apertures 132, 133, 134, 135 and 136. The aperture or opening 132 extends clear through the valve head 118. All of the openings are equidistantly spaced in a circle about the pin 131, so as to match up with the ports 111', 112' and 113'.

The valve head 118 is maintained in place on the seat portion 115 by means of a guiding ring 140 held in place by a plurality of studs 139 threaded into the bore 117 and into engagement with diagonally corresponding seats 144 formed in the upper outer corner of the ring member 140. The bonnet or cap member 116 is provided with a plurality of recesses 141 for accommodating the external ends of the studs 139. The studs 139 are locked in place by lock nuts 142, disposed in the recesses 140.

As best shown in Figure 7, I employ preferably three studs 139 for maintaining the ring member 140 in position. The ring 140 has three openings 145, 146 and 147 which are adapted to register with the opening 132 in the valve head 118 at its various operative positions.

The upper end of the cylindrical bore 117 of the bonnet communicates with a lateral inlet pipe opening 148 into which the end of the pipe 42 is threaded. When the valve head is in a position with its opening 132 in communication with the opening 146 in the member 140, the press will be disconnected from the hydraulic pump due to the fact that the liquid is by-passed back through ports 146, 111', and return pipe 42 to the pump.

Referring to Figures 8 and 11, it will be observed that the openings 135 and 136 are connected by a passageway 150 and that the openings 133 and 134 are connected by a passageway 151. These passageways 150 and 151 cooperate with their associated openings to form U-shaped passageways, as is obvious from the construction shown in Figure 11. Preferably I form each of the passageways 150 and 151 by drilling a hole laterally into the head portion 118, as shown in Figure 11. Thereafter, I weld the outer end sheet over a small cylindrical graphite block 153 in the drill hole, as shown in Figure 11. These release openings or ports are constructed in such a manner as to provide a restriction to the flow of liquid. The above arrangement reduces the tendency of the valve to be raised off its seat when the pressure is released from the press. Also, it is much easier to lap the valve into a seat when a construction such as that I have illustrated is employed.

Associated with the upper end of the cap or bonnet member 116 is a semi-annular bracket member 160 secured to a reduced portion 161 of the cap 116 by means of three bolts 162. This member 160 has a pair of upwardly extending lateral extensions 164 and 165 (Figures 4 and 5). The extensions 164 and 165 are adapted to serve as stops for limiting the movement of the wrench-like lever 128. When the lever is in a central position between the two stops 164 and 165, the liquid under pressure will be by-passed and the press will be disconnected from the pump. Also, it should be observed that I provide the body or base 116 with a plurality of sockets 166 which are adapted to be used in connection with a spanner wrench.

The operation of my novel valve mechanism is briefly as follows:

Normally the lever 128 will be disposed in its central or neutral position so that the hydraulic press is disconnected from the pump 18. When in this position the valve head 118 will have its through port opening 132 in register with the port opening 111' in the base 110. This opening 111' communicates with the pressure line 41 of the pump. The upper end of the opening 132 will communicate through the opening 146 in the ring member 140 with the upper end of the cylindrical bore 117. This bore 117 is connected to the return pipe line 42 which discharges into the supply reservoir of the pump 18. Thus it will be obvious that when the lever is in a neutral position the liquid will be effectively by-passed as far as the hydraulic press is concerned.

Now, on the other hand, when the lever 128 is moved into one of its other positions, as for instance, into engagement with the stop 165, the port or opening 132 in the valve head will be automatically disconnected from the two openings 146 and 111'. However, when the lever is in this position, the opening 133 will be connected to the port opening 111'. Also, the port 134 will be connected to the port 113' which communicates with pipe line 39. Since the two port openings 133 and 134 are tied together by means of the connecting opening 151, liquid under pressure will be forced from the supply pipe line 41 through the two openings 133 and 134 into the pipe line 39. This results in an upward pressure being applied to the piston 71 of plunger 32.

Also, in moving the lever 128 into engagement with the stop 165, the opening 132 is brought into register with the port opening 112', communicating with pipe line 38. As the piston 71 is forced upwardly by the entering liquid under pressure from the pipe line 39, the liquid above the plunger 32 is forced outwardly through the port 132 in valve head 118, through opening 145 in ring 140, into the cylindrical bore 117 and into the return pipe 42. Thus it will be seen that at the same time that liquid is supplied to the cylinder, other liquid is forced from the cylinder through the valve of my invention and back to the pump.

Assume that instead of moving the lever 128 into contact with the stop 165, it is moved into its other extreme position, namely, against the stop 164. When in this position the port 132 will be brought into communication with the port 113' communicating with pipe line 39.

Port opening 135 will be brought into register with the pressure line port opening 111'. The port opening 136 will at that time be in communication with the port opening 112' connected to pipe line 38. Since the two openings 135 and 136 are tied together by means of the passageway 150, liquid under pressure will be supplied from the pump 18, through the line 41, through the two openings 135 and 136, into the pipe line 38 which discharges into the top of the cylinder 22. The liquid being discharged into the cylinder 22 will force the plunger 32 downwardly and, at the same time, will cause the liquid below the piston 71 to be forced out through the valve 20 into the return line 42.

From the foregoing, it will be obvious that the operation of my control valve 20 is very simple. The control lever 28 has three positions; one extreme position applies pressure to the pressure end of the piston for pressing; another extreme position releases the pressure from the upper end of the piston and applies pressure to the lower end to return the plunger to its uppermost or return position; and the third or central position of the lever releases the pressure from both ends of the piston, but causes the liquid in the cylinder on both sides of the piston to be held in place. The central position of the lever 28 enables the liquid from the pump to be by-passed back to the pump without interfering with the liquid already in the cylinder of the press.

It is to be observed that the ports are lapped, i. e., there is a position when the ports are out of register completely and all of the connections are thereby closed off. This is not objectionable because the pressure release valve 263 would prevent damage to the parts. In normal operation the valve is moved rapidly and easily from one position to another without the necessity of opening the relief valve, and without any appreciable rise in pressure.

Now I desire it understood that although I have described and illustrated in detail the preferred embodiment of my invention, the invention is not to be thus limited, but only in so far as defined by the scope and spirit of the appended claims.

Obviously, the press may be horizontal or at any angle. Also, the valve of my invention may be employed for operating two or more cylinders, as in a compound press.

I claim:—

1. In combination, in a valve, a base member, a cap member connected to said base member, said members defining an annular chamber, a valve having its head portion disposed in said chamber and having its shank extending out of said cap member, a plurality of fluid connections terminating in said base member, a return fluid connection terminating in said cap member in communication with said chamber, said valve head member having a plurality of openings adapted to register with said return fluid connection openings and means connected to the external end of the shank portion for turning the same, and means for preventing lateral motion of said valve-head, comprising a pivot pin disposed in axially aligned apertures in the valve head and base member.

2. In combination, in a valve, a casing having a fluid pressure inlet port connected to its lower end, a fluid return port connected to its upper end, and a plurality of outlet ports also connected to its lower end, and means for selectively providing a communication between said ports comprising a rotary valve member extending into said casing, said casing having a seat for an end of said member and having a chamber above the valve member in communication at all times with said return port, a ring member adjustably held on said valve member for holding it on its seat, openings through said ring member in alignment with said ports, and a pivot pin in said valve member, for preventing the engagement of the valve member with the side of said casing.

3. In combination, in a valve, a casing having a plurality of ports and means for selectively providing communication between the ports comprising a rotary valve member, having a seat portion and a shank extending out of said casing, one of said ports comprising an outlet and return port disposed above said rotary member, said casing having formed therein a seat for said seat portion, and means for retaining said seat portion in place on said seat and for preventing endwise movement of said valve member comprising aligned apertures in said valve and seat, a pivot pin disposed in said apertures, and an adjustably held ring member engaging the upper end of said valve member, said seat portion having a plurality of openings adapted to be aligned with openings in said seat which latter openings are in direct communication with said ports, one of said openings being of substantially a U shape.

4. In combination, in a valve, a casing having a plurality of ports, means for selectively providing communication between said ports comprising a rotary valve member and means for holding the member in place and for preventing endwise movement of the member comprising a ring member and a plurality of bolts extending obliquely through the casing and engaging the ring member to retain it in place.

5. In combination, in a valve, a casing having a plurality of ports and means for selectively providing communication between the ports comprising a rotary valve member having a U-shaped passage adapted to be registered with two of said ports to connect them, said valve member also having a cut off opening adapted to be connected to any of said ports and means for preventing said valve member from being moved endwise, means for preventing lateral motion of said valve, comprising aligned apertures in said valve head and in said base and a pivot pin disposed within said apertures.

6. In a valve, a body portion having a flat circular valve seat and longitudinal passages, three in number, terminating in ports in said seat, one of said passages being a pressure passage, the other passages being adapted to be connected to opposite sides of an operating piston, a rotary disc valve having a flat rotary face and having five passages cooperable with said ports in the valve seat, a liquid return opening in said body portion above said rotary disc valve, one of said disc valve passages comprising a return passage and extending through the valve disc and communicating with said liquid return opening, the two passages on one side of said return passage being connected by a closed U-shaped passageway, and the two passages on the opposite side of said return passage being connected by a closed U-shaped passageway, and means for rotating said valve in contact with said valve seat to bring the said return passage of the disc valve into register with any one of the three ports of the valve seat.

7. In a valve, a body portion having a flat circular valve seat and longitudinal passages, three in number, terminating in ports in said seat, one of said passages being a pressure passage, the other passages being adapted to be connected to opposite sides of an operating piston, a rotary disc valve having a flat rotary face and having five passages cooperable with the ports in said valve seat, a liquid return opening in said body portion above said rotary disc valve, one of said disc valve passages comprising a return passage and extending through the valve disc and communicating with said liquid return opening, the two passages on one side of said return passage being connected by a closed U-shaped passageway and the two passages on the opposite side of said return passage being connected by a closed U-shaped passageway, means for rotating said disc valve in contact with said valve seat to bring the return passage of the valve into register with any one of the three ports of the valve seat and a guide and holding ring for holding the disc valve upon the valve seat, said ring having three passages therethrough adapted to cooperate with the disc valve in establishing a selective communication between the return opening and the three ports in the valve seat.

In witness whereof, I hereunto subscribe my name this 20th day of September, 1926.

EDWIN T. DAVIS.